US011076027B1

(12) United States Patent
Sharp et al.

(10) Patent No.: US 11,076,027 B1
(45) Date of Patent: Jul. 27, 2021

(54) NETWORK COMMUNICATIONS PROTOCOL SELECTION BASED ON NETWORK TOPOLOGY OR PERFORMANCE

(71) Applicant: Amazon Technologies, Inc., Seattle, WA (US)

(72) Inventors: Nathan William Sharp, Seattle, WA (US); Christopher Magee Greenwood, Seattle, WA (US); Pavel Labovich, Bothell, WA (US); Colin Williams, Seattle, WA (US); Ashritha Nagavaram, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 163 days.

(21) Appl. No.: 16/208,148

(22) Filed: Dec. 3, 2018

(51) Int. Cl.
*H04L 29/06* (2006.01)
*H04L 29/08* (2006.01)
*H04L 12/26* (2006.01)

(52) U.S. Cl.
CPC .......... *H04L 69/24* (2013.01); *H04L 43/0852* (2013.01); *H04L 67/42* (2013.01); *H04L 69/326* (2013.01)

(58) Field of Classification Search
CPC ....... H04L 69/24; H04L 69/326; H04L 67/42; H04L 43/0852
See application file for complete search history.

(56) References Cited

U.S. PATENT DOCUMENTS

| | | | | |
|---|---|---|---|---|
| 7,489,632 B2* | 2/2009 | Lakkakorpi | ........... | H04L 47/125 370/229 |
| 8,073,968 B1* | 12/2011 | Shah | ....................... | H04L 45/00 709/238 |
| 8,817,661 B2* | 8/2014 | Zhang | ............... | H04W 36/0055 370/254 |
| 9,094,309 B2* | 7/2015 | Branch | ............... | H04L 41/0853 |
| 9,811,363 B1* | 11/2017 | Wagner | ............... | G06F 9/44521 |
| 9,811,434 B1* | 11/2017 | Wagner | .................... | G06F 8/43 |
| 9,830,175 B1* | 11/2017 | Wagner | ................. | G06F 9/5077 |
| 10,674,394 B2* | 6/2020 | Shi | .................... | H04W 28/0289 |
| 2005/0283649 A1* | 12/2005 | Turner | ................... | H04L 51/22 714/6.12 |
| 2012/0179800 A1* | 7/2012 | Allan | ..................... | H04L 45/38 709/223 |

(Continued)

FOREIGN PATENT DOCUMENTS

WO WO-2014033501 A1 * 3/2014 ........... H04L 45/122

*Primary Examiner* — Kostas J Katsikis
(74) *Attorney, Agent, or Firm* — Nicholson De Vos Webster & Elliott LLP

(57) ABSTRACT

Techniques for selecting a network communications protocol based on network topology and/or network performance are described. A first application executing on a first computer system obtains a distance characteristic of a network coupling the first computer system to a second computer system. The first application selects a network communications protocol from a plurality of network communications protocols based on the distance characteristic of the network. The first application and the second application connect with the selected network communications protocol. In some embodiments, the distance characteristic of the network may be based on topological or performance characteristics of the network.

10 Claims, 6 Drawing Sheets

(56) References Cited

U.S. PATENT DOCUMENTS

| | | | | |
|---|---|---|---|---|
| 2012/0257597 A1* | 10/2012 | Zhang | ............... | H04W 36/0055 |
| | | | | 370/331 |
| 2013/0152175 A1* | 6/2013 | Hromoko | ........... | H04W 36/0011 |
| | | | | 726/5 |
| 2013/0246606 A1* | 9/2013 | Branch | ............... | H04L 41/0853 |
| | | | | 709/224 |
| 2013/0273960 A1* | 10/2013 | Zhang | .................. | H04W 48/04 |
| | | | | 455/517 |
| 2014/0155023 A1* | 6/2014 | Cole | .................... | H04W 64/00 |
| | | | | 455/405 |
| 2014/0235244 A1* | 8/2014 | Hinman | ................ | H04W 48/18 |
| | | | | 455/436 |
| 2014/0280873 A1* | 9/2014 | Stickle | ................ | H04L 63/1433 |
| | | | | 709/224 |
| 2015/0245409 A1* | 8/2015 | Medapalli | ............. | H04W 76/15 |
| | | | | 370/329 |
| 2015/0341383 A1* | 11/2015 | Reddy | ................ | H04L 63/1466 |
| | | | | 726/22 |
| 2017/0125073 A1* | 5/2017 | Palmer | ................ | G06F 11/3409 |
| 2017/0212784 A1* | 7/2017 | Johnsen | ............. | H04L 61/6068 |
| 2017/0359272 A1* | 12/2017 | Srinivasan | ........... | H04L 43/0876 |
| 2018/0013826 A1* | 1/2018 | Sikdar | ..................... | G06F 3/061 |
| 2019/0132767 A1* | 5/2019 | Shi | ........................ | H04W 24/08 |
| 2019/0182170 A1* | 6/2019 | Kulkarni | ............... | H04L 47/125 |
| 2020/0007430 A1* | 1/2020 | Klemetti | ................ | G06N 20/20 |

\* cited by examiner

NETWORK COMMUNICATIONS PROTOCOL SELECTION BASED ON NETWORK TOPOLOGY OR PERFORMANCE

BACKGROUND

Communications standards and protocols such as the Internet Protocol (IP), Transmission Control Protocol (TCP), HyperText Transfer Protocol (HTTP), Universal Serial Bus (USB) standard, Peripheral Component Interconnect-Express (PCIe) standard, and others are the product of many engineering design choices that involve tradeoffs between protocol performance, flexibility, scalability, reliability, compatibility, cost, and other factors. For example, wireless Ethernet connections generally offer greater location flexibility (e.g., endpoint mobility) and less reliability (e.g., due to interference) than wired Ethernet connections. At the same time, wireless Ethernet connections generally offer greater performance but less location flexibility than certain cellular communications offerings.

Computer networks can include a variety of networking components such as routers, switches, gateways, firewalls, client computer systems, server computer systems, and the like. Various computer network topologies, such as star networks, ring networks, mesh networks, switching fabrics, or combinations thereof, can be used to arrange connections between networking components and to create hierarchical networks. As with communications standards and protocols, the selection of a network topology or network topologies for a computer network involve tradeoffs between cost, performance, flexibility, scalability, reliability, susceptibility to congestion, cost, and other factors. Ring networks are generally lower-cost than mesh networks, while mesh networks generally scale better than ring networks as the network expands.

BRIEF DESCRIPTION OF DRAWINGS

Various embodiments in accordance with the present disclosure will be described with reference to the following drawings.

DETAILED DESCRIPTION

Figure 1:
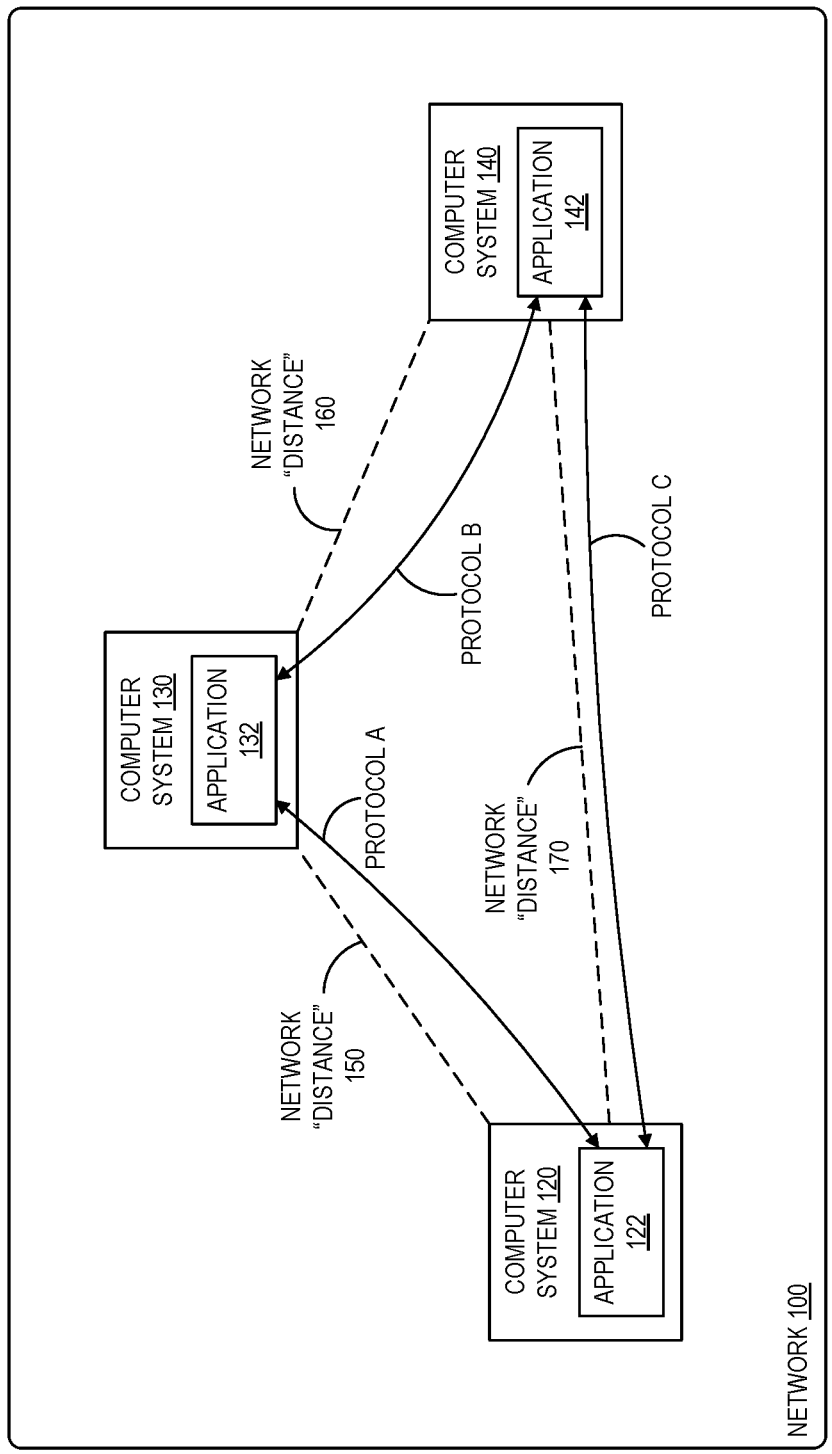
FIG. 1 is a diagram illustrating an environment for selecting a communications protocol based on network topology or performance according to some embodiments.

Various embodiments of methods, apparatus, systems, and non-transitory computer-readable storage media for selecting a communications protocol based on network topology or performance are described. According to some embodiments, a software application executing on a first computer system can communicate with a software application running on a second system using one of a number of different communications protocols. The different communications protocols may offer varying levels of performance, reliability, etc., depending on conditions of a network, such as the physical cable-distance between networked computer systems, the number of intermediate routing hops between computer systems, the number of lost packets, etc. Thus, a given communications protocol may provide better performance than another communications protocol under certain conditions while providing worse performance under different conditions. One software application selects the communications protocol to communicate with the other software application given the network conditions based on one or more network characteristics, such as the measured or monitored performance of the network, identifiers of the network location of the software application (or its host computer system), identifiers of the network location of the other software application (or its host computer system), regions of the network that include communicating software applications, etc. The selection may be made prior to attempting to connect, during a handshaking process after a connection attempt has begun, or after a connection has been established for communications using one of the available communications protocols and there is a change in a network characteristic indicating another communications protocol would provide improved performance.

In some embodiments, the different communications protocols are transport layer protocols that communicate over an Internet Protocol (IP)-based network. Exemplary transport layer protocols include the Transport Layer Protocol (TCP), User Datagram Protocol (UDP), Data Center TCP (DCTCP), CUBIC TCP, TCP BBR, and Reliable UDP (RUDP). These protocols vary in their implementation of transport layer functions such as flow control, packet acknowledgment and retransmission, windowing, etc. In some embodiments, higher layer protocols that facilitate communications between applications also vary, such as network-based storage protocols including the Global Network Block Device (GNBD) protocol and the Non-Volatile Memory Express over Fabrics (NVMe-oF) protocol. For example, in some embodiments, a distributed storage system application communicates via a GNBD protocol driver operating over TCP or via a NVMe-oF protocol driver operating over TCP BBR.

In some embodiments, the network characteristics on which communications protocol selections are based include architectural characteristics of the network. For example, in a N-tiered, hierarchical network layout, some endpoints can communicate via a more proximate tier than other endpoints. The path through the network through which those communications travel or the region that includes the endpoints may be considered architectural characteristics of the network. For example, a data center may employ a Clos-based network fabric where endpoints are first aggregated at the rack level (e.g., via a top-of-rack switch), the top-of-rack switches are aggregated at a leaf (e.g., via a leaf switch), and the leaves are aggregated at a spine (e.g., via a spine switch). Thus, endpoints in the same rack may communicate via a top-of-rack switch, endpoints in the same leaf may communicate via a leaf switch, and endpoints in the same spine may communicate via a spine switch. Endpoints may be associated with an identifier that associates the endpoint with a region of the network (e.g., the same rack, the same leaf, the same spine, etc.). In some embodiments, the identifier may be an IP address, although in embodiments where IP addresses may move around the network, the identifier may be a string or other value that identifies the region of the network.

In some embodiments, the network characteristics on which communications protocol selections are based include performance characteristics of communications between endpoints on the network. For example, two software applications may establish communications across the network using a first communications protocol, and at least one of the software applications monitors the communications between the applications to determine the performance of the network by measuring parameters such as packet loss, packet latency, the number of routing hops between the endpoints, etc. In some embodiments, the software application builds a profile for the connection (e.g., a latency histogram) and determines statistical parameters such as the mean and standard deviation of the latency of communications between the endpoints. If the performance characteristic or characteristics of the communications fall below (or rise above) a threshold, the software applications may switch to a different communications protocol more suitable for the measured level of performance of the network.

By altering the communications protocol used to communicate between computer systems, much higher levels of software application performance can be obtained. For example, in distributed storage systems where large amount of data must be transferred quickly, higher performance communications protocols can be used when the network topology or performance permits, improving the performance of the distributed storage system.

FIG. 1 is a diagram illustrating an environment for selecting a communications protocol based on network topology or performance according to some embodiments. A network 100 couples computer systems 120, 130, 140. The network 100 includes the physical interconnect and routing components (not shown) that transmit communications between the computer systems, such as cabling, routers, switches, gateways, firewalls, and the like. Computer systems 120, 130, and 140 respectively execute software applications 122, 132, and 142. Software applications 122, 132, and 142 communicate via the network 100, e.g., using a client-server model, a peer-to-peer model, a tiered model, or other type of distributed computing arrangement. For example, software application 122 may be a server application handling requests from client applications 132, 142.

A network "distance" 150 separates computer systems 120 and 130, a network "distance" 160 separates computer systems 130 and 140, and a network "distance" 170 separates computer systems 140 and 150. In this context, distance refers to the topological and/or performance characteristics of the portion of the network 100 handling communications between computer systems. For example, a "short" distance may correspond to less than or equal to two routing hops, a "medium" distance may correspond to three to five routing hops, and a "long" distance may correspond to greater than five routing hops. As another example, a "short" distance may correspond to less than or equal to a four milliseconds (ms) delay, a "medium" distance may correspond five to eight ms delay, and a "long" distance may correspond to greater than eight ms delay. As yet another example, a "short" distance may correspond to less than or equal to a 0.01% of packets dropped, a "medium" distance may correspond 0.01% to 0.05% of packets dropped, and a "long" distance may correspond to greater 0.05% of packets dropped. In some embodiments, the distance may be a function of a combination of topological and performance characteristics.

The software applications executing on the computer systems select a communications protocol based on the network distance between their host computer systems. As illustrated, the applications 122, 132 communicate using protocol A, the applications 132, 142 communicate using protocol B, and the applications 122, 142 communicate using protocol C. Protocol A may be optimized for short distances, protocol B for medium distances, and protocol C for long distances. For example, protocol A may be a lower-reliability, higher-performance protocol relative to the other protocols (e.g., UDP), protocol B may be a medium-reliability, medium-performance protocol relative to the other protocols (e.g., TCP BBR), and protocol C may be a higher-reliability, lower-performance protocol relative to the other protocols (e.g., TCP). The selection of a protocol is based on one or more characteristics of the portion of the network handling communications between the computer systems. For example, protocol B may operate better than protocol C under some conditions (e.g., less than five routing hops, less than 10 ms latency) but worse than protocol C under other conditions (e.g., five or greater routing hops, greater than 10 ms latency).

In some embodiments, the network 100 is a cloud-computing provider network that provides users with the ability to utilize one or more of a variety of types of computing-related resources such as compute resources (e.g., executing virtual machine (VM) instances and/or containers, executing batch jobs, executing code without provisioning servers), data/storage resources (e.g., object storage, block-level storage, data archival storage, databases and database tables, etc.), network-related resources (e.g., configuring virtual networks including groups of compute resources, content delivery networks (CDNs), Domain Name Service (DNS)), application resources (e.g., databases, application build/deployment services), access policies or roles, identity policies or roles, machine images, routers and other data processing resources, etc. These and other computing resources may be provided as services, such as a hardware virtualization service that can execute compute instances, a storage service that can store data objects, etc. The users (or "customers") of the provider network may utilize one or more user accounts that are associated with a customer account, though these terms may be used somewhat interchangeably depending upon the context of use. Users may interact with the provider network across one or more intermediate networks (e.g., the internet) via one or more provider-network interface(s) (not shown), such as through use of application programming interface (API) calls, via a console implemented as a website or application, via an SSH-based command line, etc. The provider-network interface(s) may be part of, or serve as a frontend to, a control plane of the provider network that includes "backend" services supporting and enabling the services that may be more directly offered to customers.

To provide these and other computing resource services, provider networks often rely upon virtualization techniques. For example, virtualization technologies may be used to provide users the ability to control or utilize compute instances (e.g., a VM using a guest operating system (O/S) that operates using a hypervisor that may or may not further operate on top of an underlying host O/S, a container that may or may not operate in a VM, an instance that can execute on "bare metal" hardware without an underlying hypervisor), where one or multiple compute instances can be implemented using a single electronic device. Thus, a user may directly utilize a compute instance hosted by the provider network to perform a variety of computing tasks or may indirectly utilize a compute instance by submitting code to be executed by the provider network, which in turn utilizes a compute instance to execute the code (typically without the user having any control or knowledge of the underlying compute instance(s)).

In some embodiments, the provider network control plane includes services to manage the consumption of computing resources (e.g., systems hosting compute instances, storage volumes, etc.). Such services may include load balancing services to redirect traffic within the provider network and migration services to migrate a customer's instance or volume from one host computer system to another host computer system. Thus, from the perspective of an application, such as applications 122, 132, and 142, the topology or performance characteristics of the network may change over time. In some embodiments, a change in a characteristic of the network between two communicating applications causes the applications to disconnect, forcing re-establishment of communications and re-negotiation of the protocol. In some embodiments, one or both of the communicating applications detect a change in a characteristic of the network between the two applications and re-negotiate the protocol without terminating a connection (e.g., by switching a protocol operating over an established transport-layer connection).

Figure 2:
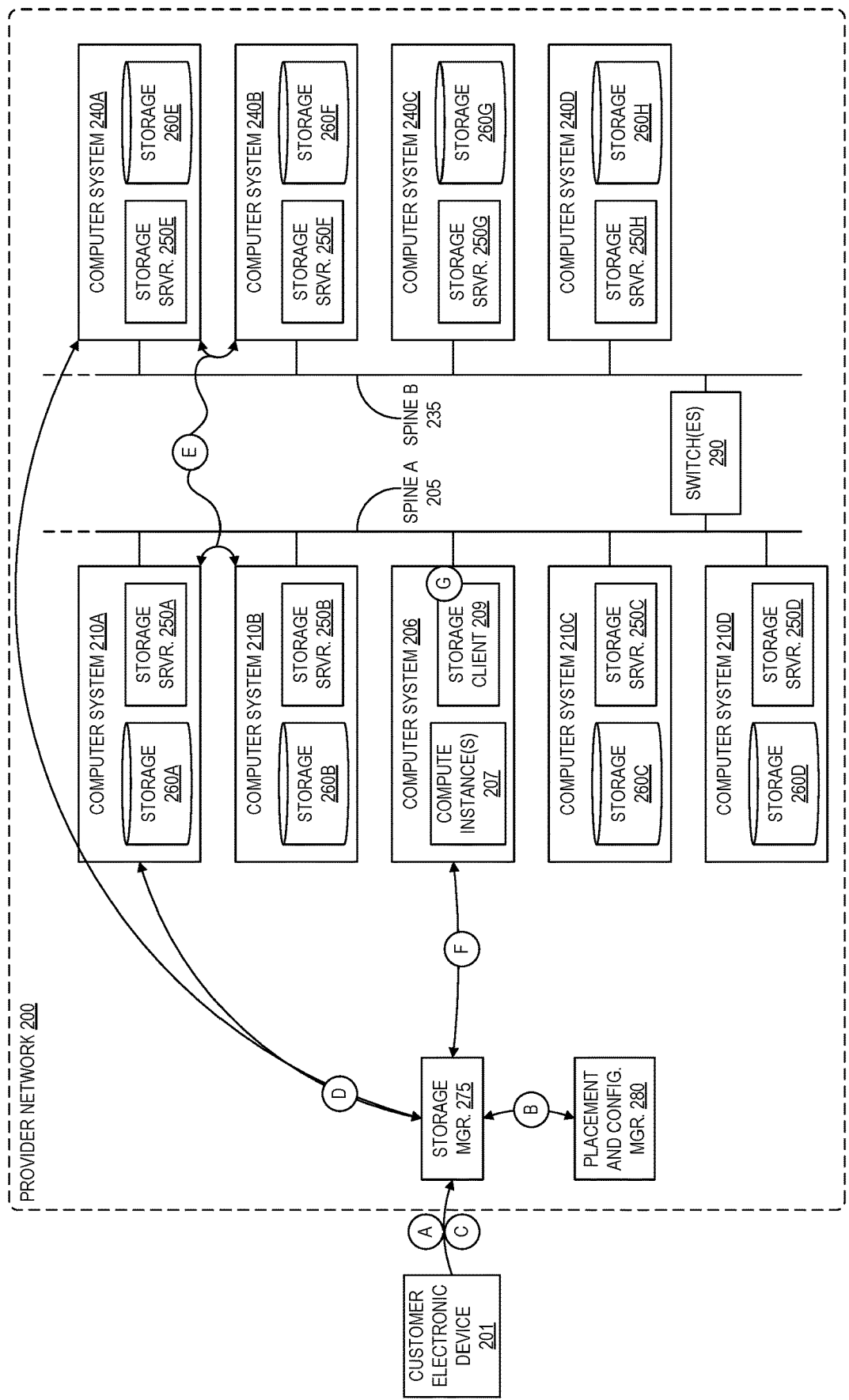
FIG. 2 is a diagram illustrating an environment for selecting a communications protocol based on network topology for a distributed storage system according to some embodiments.

FIG. 2 is a diagram illustrating an environment for selecting a communications protocol based on network topology for a distributed storage system according to some embodiments. A provider network 200 includes computer systems 206 and 210A-210D coupled to a first portion of the provider network 200 and computer systems 240A-240D coupled to a second portion of the provider network 200. In this example, the first portion of the provider network 200 corresponds to a spine 205 ("Spine A") of the provider network 200, and the second portion of the provider network 200 corresponds to a spine 235 ("Spine B") of the provider network 200. One or more switches 290 couple the spine 205 to the spine 235. In some embodiments, the spines 205, 235 interconnect one or more leaves (not shown), and each of the leaves include one or more racks of computer systems. In some embodiments, the portions of the provider network correspond to other regions in the provider network that may be larger or smaller than a spine (or other level in a network topology).

The provider network 200 provides customers with computing relating resources. For example, customer-instance hosting computer systems in the provider network, such as computer system 206, use virtualization techniques to allow multiple, different customers to launch and control independent compute instances 207 sharing the same underlying host computer system. To provide the compute instances 207 with storage, the provider network may rely on a network-based storage service. Such a storage service may be implemented using a client-server model. The instance-hosting computer system 206 includes a storage client application 209 which connects a compute instance 207 to one or more storage-hosting computer systems in the provider network 200 executing storage server applications, such as storage server applications 250A-250H executing on computer systems 210A-D and 240-A-D. The computer systems 210A-D and 240-A-D include storage 260A-H. The storage 260A-H may be implemented as one or more types of non-transitory storage media, such as solid-state drives (e.g., using Flash-based media), hard-disk drives (e.g., using magnetic media), and the like. In some embodiments, a computer system may both host customer instances and provide customer instances with storage (e.g., include a storage server 250).

In some embodiments, control plane services are implemented to control the configuration and placement of hosted software applications throughout the provider network to efficiently utilize the finite amount of computing resources within a provider network (e.g., CPUs, memory, storage drives, etc.). In the illustrated embodiment, the provider network 200 includes a storage manager service 275 and a placement and configuration manager service 280, both of which may be considered part of the control plane of the provider network 200. Note that the connections of the control plane services to the other computer systems, 210, 240 are not shown as the location of the control plane services within the provider network typically does not affect communications protocol selection.

The storage manager service 275 receives customer requests to perform storage management operations via a frontend interface (not shown). Exemplary storage management operations include creating new storage volumes, deleting existing storage volumes, attaching storage volumes to customer compute instances so that they are accessible to the instance, and detaching storage volumes from customer compute instances. In some embodiments, a storage volume is associated with a storage geometry. For example, a storage volume may be divided into multiple partitions or fragments which, from the perspective of a compute instance to which the storage volume is attached, appear as a single block storage device. Such a division may improve the performance of a volume (e.g., by striping the data across a distributed group of storage servers). Further, each partition may have one or more replicas associated with it to mitigate against data loss, where the primary partition (sometimes referred to as the master partition) and the replicas (sometimes referred to as the slave or replica partition(s)) are hosted by storage servers on different computer systems. Note that a storage server may host a master partition for one volume and a replica partition for another volume. Together, the number of partitions and their associated redundancy parameters may be considered a volume geometry. As a specific example of a volume geometry, a storage volume may be divided into two partitions, A and B, each having a single replica.

The placement and configuration manager service 280 maintains the state of the configuration of the computer systems of the provider network. The state of the configuration may change over time as failures occur, customers start and stop services, or as other backend services move computing-related resources within the provider network (e.g., for load balancing, etc.). Given the state illustrated in FIG. 2, the configuration maintained by the placement and configuration manager service 280 indicates that the storage client 209 and one or more compute instances 207 are hosted on the computer system 206, storage servers 250A-D are respectively hosted on computer systems 210A-D, and that storage servers 250E-H are respectively hosted on computer systems 240A-D.

The placement and configuration manager service 280 further recommends hosts within the provider network 200 for the placement of computing-related resources. For example, when a customer requests the launch of a compute instance, a backend service may obtain the identity of a computer system within the provider network on which to launch the compute instance from the placement and configuration manager service 280. In this example, the storage manager service 275 may request the identities of computer systems within the provider network that can host at least a portion of a volume geometry (e.g., a master partition, a partition replica).

A description of an exemplary flow of operations associated with the creation and attachment of a storage volume to a compute instance, and the subsequent communications protocol negotiation between the storage client and storage servers, follows with reference to the encircled letters "A" through "G." In the example, a volume is divided into two partitions, and each partition is associated with a master and a replica. Other volume geometries are possible (e.g., a single partition or sixteen partitions, zero replicas or two or more replicas, etc.).

At circle A, a customer causes an electronic device 201 to issue a command to create a storage volume to a frontend interface of the provider network (not shown). The frontend interfaces may subsequently issue a volume creation command to the storage manager service 275. Upon receipt, the storage manager service 275 creates a volume geometry. The volume geometry may be based on one or more parameters, such as a number of input/output (I/O) operations per second, the size of the volume, the backup requirements for the volume, etc., at least some of which may be specified by the customer.

At circle B, the storage manager service 275 sends a message to the placement and configuration manager service 280 to obtain placement information for the volume. For a two-partition, single-replica volume, the placement and configuration manager service 280 allocates four storage servers, as described in a series of examples below, one for the first partition ("Partition A") master, one for the Partition A replica, one for the second partition ("Partition B") master, and one for the Partition B replica. In some embodiments, the placement and configuration manager service 280 may provide multiple candidates for each server as the configuration of the provider network may change over time prior to the initialization of the partitions on the storage servers.

At circle C, the customer causes the electronic device 201 to issue a command to attach the created storage volume to an identified compute instance. The frontend interfaces may subsequently issue an attachment command to the storage manager service 275 that includes the identified compute instance. Note that in some embodiments, the creation and attachment of a volume may be a single operation where the command includes both any parameters related to the configuration of the volume and the identity of a compute instance. In this example, the customer requests that the provider network attach the created volume to one of the compute instances 207 hosted on the computer system 206.

At circle D, the storage manager server 275 sends a message to the storage servers designated to host master partitions, subject to the placement as provided by the placement and configuration manager. In this example, two of the four parts of the volume are placed within a region of the provider network associated with Spine A 205, and the other two parts are placed within a region of the provider network associated with Spine B 235. In particular, the Partition A master is placed on the storage server 250A hosted on the computer system 210A, the Partition A replica is placed on the storage server 250B hosted on the computer system 210B, the Partition B master is placed on the storage server 250E hosted on the computer system 240A, and the Partition B replica is placed on the storage server 250F hosted on the computer system 240B. In this example, the message sent from the storage manager service 275 to the storage servers masters includes an identification of the storage servers and/or of computer systems designated to host the replicas and may further include an identification of the storage client 209, the compute instance 207 to which the volume is being attached, and/or of the computer system 206. Alternatively, the message may include one or more identifiers that the storage server may use to fetch additional identifying information from the placement and configuration manager service 280. For example, the message may include an identifier of the specific compute instance to which the volume is being attached and the storage server can fetch identifying information related to the associated storage client (e.g., an IP address, an identifier, etc.). As another example, the message may include an identifier of a storage server designated to host a replica and the storage server hosting the master can fetch identifying information related to the associated computer system hosting the replica storage client (e.g., an IP address).

At circle E, the storage servers 250A and 250E hosting the partition masters connect to the storage servers 250B and 250F hosting the respective replica partitions. As the connection process may involve a protocol selection similar to that between a storage client and the storage server hosting a master partition, a description of the connection process is provided below with reference to circle G, where the storage client connects to a storage server hosting a master partition.

At circle F, the storage manager service 275 sends a message to the storage client 209 to attach the volume to the customer-specified compute instance 207. In this example, the message sent from the storage manager service 275 to the storage client includes an identification of the storage servers hosting the master partitions and/or of the computer systems hosting those storage servers. Alternatively, the message may include one or more identifiers that the storage client may use to fetch additional identifying information from the placement and configuration manager service 280. For example, the message may include an identifier of a storage server hosting a master partition and the storage client can fetch identifying information related to the hosting computer system (e.g., an IP address).

At circle G, the storage client 209 connects to the storage servers 250A, 250E hosting the master partitions. Similarly, as indicated above for circle E, the storage servers hosting the master partitions connect to the storage servers hosting the replica partition(s) associated with the master partition. As part of the connection process, the client and server negotiate a communications protocol to use for the connection. In an exemplary embodiment, the client (e.g., the storage client 209, a storage server hosting a master partition) and server (e.g., a storage server hosting a master partition, a storage server hosting a slave partition) can communicate over a set of different communications protocols. In some embodiments, the different communications protocols in the set may include one or more communications protocols. In the storage context, the different communications protocols may include both a network-based storage communications protocol and a network communications protocol. For example, the storage client application 209 can communicate with a storage server application 250 either via GNBD over TCP or via NVMe-oF over TCP BBR. In the following example, GNBD over TCP is referred to as "Protocol A" and NVME-oF over TCP BBR is referred to as "Protocol B." Protocol A and B may offer varying degrees of performance depending on the topology and/or performance of the network between the communicating endpoints. Under one set of conditions, Protocol A may outperform Protocol B, while under another set of conditions, Protocol B may outperform Protocol A.

An exemplary protocol selection (sometimes referred to as negotiation) process between client and server occurs as follows. The client connects to the server via Protocol A. As part of the establishment of the connection over Protocol A, or as part of control messaging over the connection, the client may send the server an indication that the client is eligible for Protocol B communications, an identifier of the client's location in the provider network, and/or a request to the server to inform the client if the server will permit communications via Protocol B. In the absence of an indication of the eligibility of communications via Protocol B from the server, client-server communications proceed via protocol A.

In response to the client's request to inform the client of communications eligibility over Protocol B, the server makes an eligibility determination based on one or more characteristics of the network. In one embodiment, the server makes the eligibility determination based on an identifier associated with the client's location in the provider network and an identifier associated with the server's location in the provider network. If the partition includes a replica, the eligibility determination is further based on an identifier associated with the replica server's location in the provider network. Identifiers may be an arbitrary string or value associated with a portion or feature of the network (e.g., "0xFF" corresponds to Spine A 205 and "0xFA" corresponds to Spine B 235) or a descriptive string or value (e.g., storage server 250A has an identifier "Spine-A.LeafD.Rack13," storage server 250E has an identifier "SpineB.LeafC.Rack02, etc.").

In some embodiments, the identifiers are stored within a memory of the computer systems (e.g., computer systems 206, 210) accessible to the hosted storage client or storage server and exchanged in communications between the storage client and storage server or between two storage servers (e.g., where one server hosts a master partition and another server hosts an associated replica partition). In some embodiments, the server obtains the identifiers by requesting one or more identifiers from the placement and configuration manager service 280 (including of the server's own identifier).

The server compares the obtained identifiers to make a determination regarding the network topology between the client, master server, and replica server. For example, endpoints on the same region at or portion of one level of the network (e.g., a rack) may have at most a single routing hop, endpoints on the same region at another level of the network (e.g., a leaf) may have at most two routing hops, endpoints on the same region of another level of the network (e.g., a spine) may have at most three routing hops, etc. Based on these relations, the server can determine the network topology between endpoints or infer the worst-case network topology between endpoints. In some embodiments, the relationship between identifiers and network topology is stored in the server. In other embodiments, the server may issue a call to another backend service that includes the identifiers to obtain an indication of the network topology (e.g., the number of hops). In some embodiments, the identifiers may be compared for a match (e.g., storage server 250A has identifier 0xFF and storage client 209 has identifier 0xFF). If the eligibility determination indicates that communications between the client and server are eligible for Protocol B, the server sends a message to the client to indicate to the client that it can connect to the server using protocol B.

In some embodiments, the eligibility message sent from the server to the client is contingent on the client, the server, and the associated replica server(s), if any, having identifiers associated with the same region at a given level of the network. For example, a master partition hosted by storage server 250C on computer system 210C, an associated replica partition hosted by storage server 250D on computer system 210D, and a storage client 209 on computer system 206 would result in a positive eligibility determination by the storage server 250C because each of the endpoints involved in the communication (i.e., from the storage client 209 to the storage server 250C and from the storage server 250C to the storage server 250D) are associated with the same spine identifier. As a result, the storage server 250C would send a message to the storage client 209 indicating communications are eligible for Protocol B. As a counter example, a master partition hosted by storage server 250C on computer system 210C, an associated replica partition hosted by storage server 250H on computer system 240D, and a storage client 209 on computer system 206 would result in a negative eligibility determination by the storage server 250C because each of the endpoints involved in the communication are not associated with the same spine identifier. As a result, the storage server 250C would not send a message to the storage client 209.

In some embodiments, the eligibility message sent from the server to the client is contingent on the client and the server having identifiers associated with the same region at a given level of the network without regard to the identifier(s) associated with the server(s) hosting the replica(s).

With reference to the volume geometry placement described above with reference to circles D and E, the storage server 250E would not send an eligibility message to the storage client 209 (the identifiers associated with the storage server 250E and storage client 209 indicated they are on different spines) while the storage server 250A would send an eligibility message to the storage client 209 (the identifiers associated with the server 250A and storage client 209 indicated they are on the same spine).

The server's eligibility determination may be asynchronous relative to other communications between the client and server using Protocol A. Sometime after communications between the server and client have commenced, an external event may change the configuration of the network. Based on that event, the client and server may switch to communications using Protocol B. For example, the location of the storage server hosting a replica partition may change (e.g., due to migration, failures, etc.) As a result, the change may bring the client, the storage server hosting the master partition, and the newly located storage server hosting the replica partition into the same region of the network (e.g., connected to the same spine). When the change occurs, the storage server hosting the master partition re-connects to the storage server hosting the replica partition, obtains the associated identifier, determines communications are eligible to use Protocol B, and sends the eligibility message to the client. As another example, if the location of the storage client or storage server hosting the master partition changes, the communications between the client and server using Protocol A may be dropped or disconnect, causing the client and server to re-establish communications as described above with the possibility that the location change results in a positive eligibility determination by the server.

In some embodiments, the client re-establishes communications using Protocol B with servers that report eligibility and continues communications using Protocol A with servers that do not. In other embodiments, the client continues communications using Protocol A until all of the servers have reported eligibility. For example, if Protocol B offers higher performance than Protocol A, the client may have to buffer data read from a server using Protocol B for a longer time while it waits for data from a server using Protocol A. If the client does not have an adequately sized buffer, the client may switch its connection to each of the master partition servers between Protocol A and Protocol B as a group.

In some embodiments, a configuration change may result in an eligibility change to a connection that was previously reported as eligible for communications via Protocol B. For example, the location of the storage server hosting a replica partition may change such that the storage server is no longer on the same spine as the storage server hosting the associated master partition or storage client. In such a case, the storage server hosting the master partition re-connects to the newly-sited storage server hosting the replica partition, obtains the associated identifier, determines communications are no longer eligible to use Protocol B, and sends a message to the client indicating the ineligibility. In response, the client may reconnect to that storage server hosting the master partition using Protocol A or reconnect to all of the storage servers hosting master partitions of the volume using Protocol A.

In some embodiments, a client may attempt to connect to a server that does not support Protocol B. To avoid the delay associated with a client timeout period, servers that do not support Protocol B may respond with a negative acknowledgement message indicating the lack of support.

As described above, the storage server hosting the master partition makes the eligibility determination. In other embodiments, the eligibility determination may be carried out by the storage client. In such a case, the storage client would obtain the identifiers associated with the network locations of the storage client and storage server hosting the master partition (and, if present, the storage server(s) hosting the replica partition(s)) and make an eligibility determination based on the identifiers.

Note that in the above description, it is assumed that the storage client performs storage operations with the storage server(s) hosting the master partition(s) of a volume, and that those storage server or servers are in charge of propagating data for replication to the storage server(s) hosting the replica partition(s). In some embodiments, the storage client may issue storage operation commands which are sent to storage servers hosting the master partition and the replica partition(s), if any. Thus, in some embodiments, the storage client connects to (and negotiates a communications protocol with) both the storage servers hosting master partitions and the storage servers hosting replica partitions.

In some embodiments, the storage client, the storage server hosting the master partition, or the storage server(s) hosting the associated replica partition(s) may include a bit or flag that enables or disables the use of protocol switching. In such cases, the entity making the eligibility determination may obtain the value of the bit or flag for each endpoint considered in the eligibility determination and base the eligibility determination on the enablement status of the endpoints in addition to the identifiers associated with the endpoint's respective locations on the network.

In some embodiments, the storage client and/or storage servers may report information about the protocol being used for communication for each volume to the placement and configuration manager service 280. The placement and configuration manager service 280 may cause (e.g., via other backend services) the migration of one or more of the compute instances to which a volume is attached or the storage server(s) hosting the master partition or partition replicas to the same region of the network such that communications between the storage client and storage server(s) can use the higher performance protocol.

Figure 3:
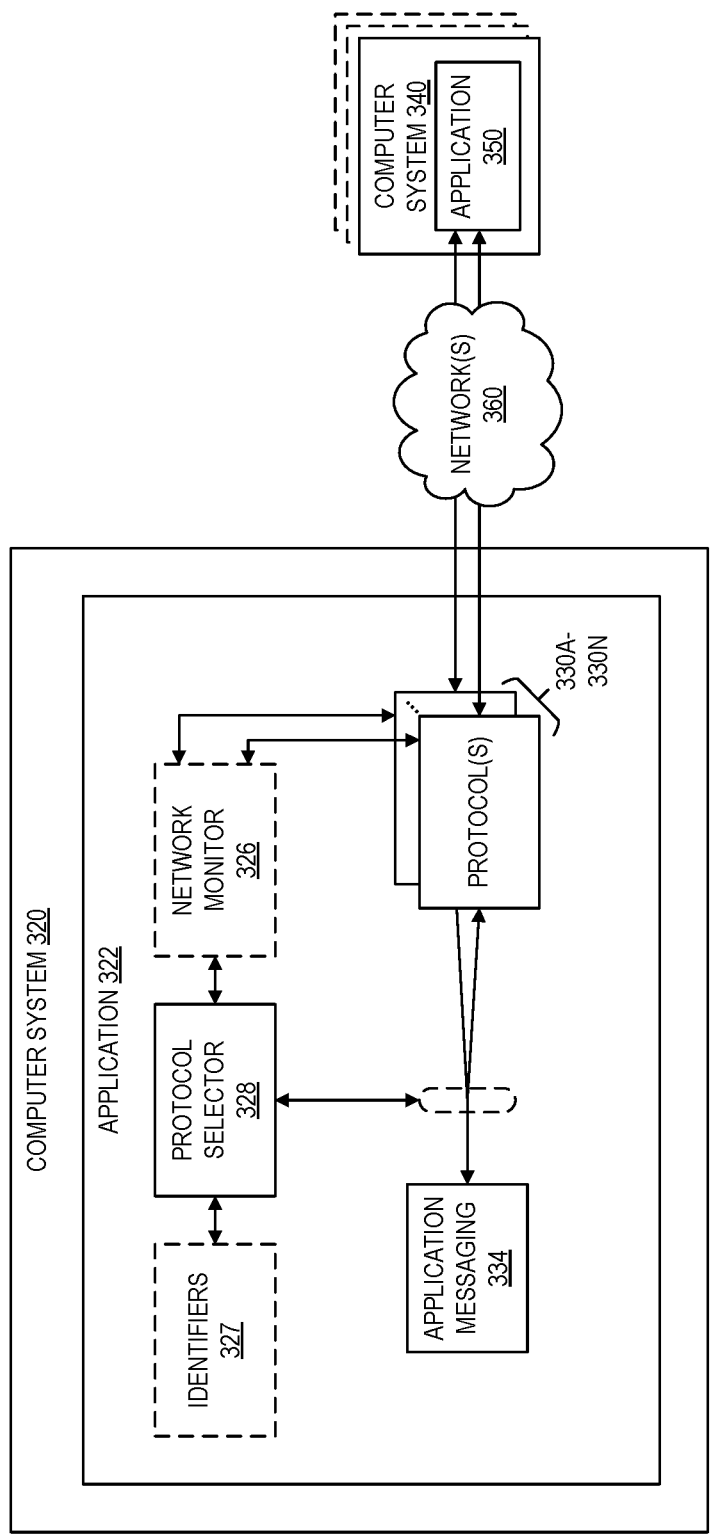
FIG. 3 is a diagram illustrating an environment including a software application for selecting a communications protocol based on network monitoring according to some embodiments.

FIG. 3 is a diagram illustrating an environment including a software application for selecting a communications protocol based on network monitoring according to some embodiments. An application 322 that is hosted by a computer system 320 communicates with an application 350 that is hosted by a computer system 340 via one or more networks 360. In this example, the application 322 includes a protocol selector 328 and can communicate with the application 350 via one or more protocols 330A-330N. As above, the protocols 330 may include one or more protocols. For example, the protocol 330A may involve a GNBD driver configured to communicate over TCP, while protocol 330B may involve an NVMe-oF driver configured to communicate over TCP BBR, etc.

In various embodiments, the application 322 includes one or both of a network monitor 326 and set of identifiers 327. The network monitor 326 is a portion of the software application 322 (e.g., instructions) that monitor aspects of the network connection between the application 322 and the application 350 and send information about those aspects to the protocol selector 328.

In some embodiments, the network monitor 326 determines aspects of the network topology by measuring or tracing the route between the applications 322, 350 through the one or more networks 360 to determine the number of routing hops between the applications 322, 350. The network monitor 326 sends an indication of the number of hops to the protocol selector 328.

In some embodiments, the network monitor 326 determines aspects of the network performance by measuring the latency and/or packet loss between the applications 322, 350. To measure latency, the network monitor 326 may rely on an out-of-band communication (e.g., not via the protocols), such as via Internet Control Message Protocol ping requests. In other embodiments, the protocol(s) or the application(s) may include instructions for special message types to measure the latency between the applications. For example, the application 322 may include a timestamp in a payload of a latency-measurement message sent to the application 350, which is configured to send back the payload of a latency-measurement message so the application 322 can approximate the network latency. To measure packet loss, the network monitor 326 may access an API provided by the protocol. If the protocol via which the applications are currently communicating includes delivery acknowledgments, the network monitor 326 may obtain the number of retransmissions (or packet loss) associated with the connection by requesting it from the portion of the application 322 or environment in which the application 322 is operating that implements the protocol. If the applications are communicating via an unacknowledged protocol, the network monitor 326 may issue messages over an acknowledged protocol to infer the packet loss associated with the connection. The network monitor 326 sends an indication of the performance to the protocol selector 328.

In some embodiments, the network monitor 326 may generate one or more statistical parameters related to the network performance over a period of time (e.g., by averaging latency or packet loss measurements over the sixty seconds, determining the mean or standard deviation over a set of measurements, etc.) and send the statistical parameter(s) to the protocol selector 328.

The set of identifiers 327 are associated with the locations of the computer system 320 and computer system 340 in the one or more networks 360, such as those identifiers described above with reference to FIG. 2. Note that in uncharacterized networks (e.g., the Internet), such identifiers may be unavailable, while in well-characterized networks (e.g., a provider network), the identifiers may be exchanged between the applications or obtained from another service, as described above with reference to FIG. 2.

In some embodiments, the protocol selector 328 is a portion of the software application 322 (e.g., instructions) that obtains information about the network from the network monitor 336 and/or from the set of identifiers 327 (which may be stored in a memory). The obtained information may be used as a characteristic of the network between the applications or used to derive a characteristic of the network. The protocol selector 328 causes the application 322 to switch protocols 330 for communications with the application 350. During switching, the application 322 may pend or queue application messages to be sent to the application 350. In some embodiments, the application 322 disconnects from the application 350 and re-connects using a different protocol.

The protocol selector 328 may evaluate the information obtained from the set of identifiers 327 and/or the network monitor 326 to make a protocol selection. The protocol selector 328 may include one or more rules or thresholds to associate the obtained information with a communications protocol. For example, a packet loss value between 0.01% and 0.10%, a latency value between 5-15 ms, and a number of routing hops between 5 and 10 may cause the protocol selector 328 to select a certain communications protocol. As another example, the protocol selector may select one protocol for any latency value above 30 ms and another protocol for any latency value between 0 and 30 ms.

In some embodiments, the protocol selector 328 may obtain identifiers from the set of identifiers 327 and determine whether the computer systems 320, 340 are within the same region of the network (e.g., on the same spine) or which region of the network the computer systems 320, 340 are in (e.g., a leaf, a spine, etc.), as described above with reference to FIG. 2, and make a protocol selection based on the network topology of the region.

In some embodiments, the number of hops between two computer systems may be used to filter the protocols that can be selected, and performance data can be used to make the selection. For example, if the number of hops is less than 5, the protocol selector 328 may select between a first protocol and a second protocol, otherwise the protocol selector 328 may select between the second protocol and a third protocol. The protocol selector 328 may then select from amongst the available protocols based on a latency value received from the network monitor 326.

In some embodiments, the application 322 and the application 350 communicate via a client-server model. As illustrated, application 322 locally makes protocol changes by monitoring the network and switching between protocols. In other embodiments, the application 322 may determine that another protocol should be used and, based on that determination, send a message to the application 350 to cause the application 350 to switch communications to a different protocol (e.g., as described above with reference to FIG. 2). If there are more than two protocols that can be used, the message may include an indication of the protocol to switch to. If there are only two protocols that can be used, the message may indicate that the application is to switch to the currently unused protocol.

In some embodiments, functionality associated with the network monitor 326 and/or protocols 330 may be accessed by the application 322 making calls to an API to another software program or set of instructions (e.g., via an external library or other service of an operating system environment of the computer system 320 within which the application 322 is executing).

In some embodiments, the applications negotiating or selecting the protocol are application layer endpoints. For example, the applications create and access the payload of datagrams communicated between the applications. As another example, the applications cause datagrams to be destined for the other application. As another example, the applications do not relay the datagrams to other entities on the network.

Figure 4:
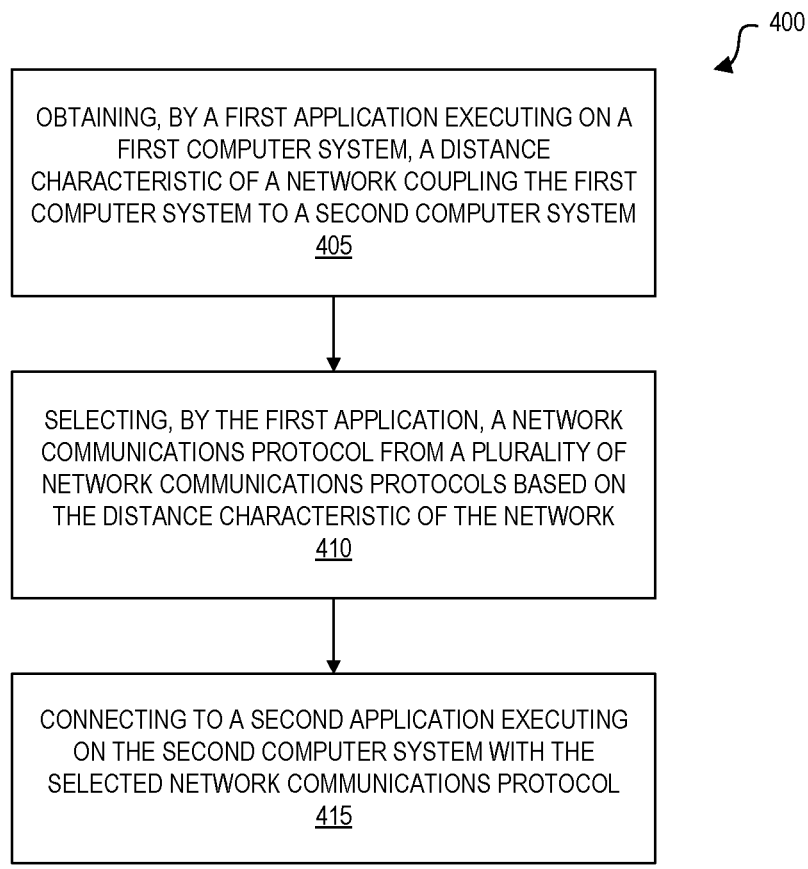
FIG. 4 is a flow diagram illustrating operations of a method for selecting a communications protocol based on network topology or performance according to some embodiments.

FIG. 4 is a flow diagram illustrating operations of a method for selecting a communications protocol based on network topology or performance according to some embodiments. Some or all of the operations 400 (or other processes described herein, or variations, and/or combinations thereof) are performed under the control of one or more computer systems configured with executable instructions and are implemented as code (e.g., executable instructions, one or more computer programs, or one or more applications) executing collectively on one or more processors, by hardware or combinations thereof. The code is stored on a computer-readable storage medium, for example, in the form of a computer program comprising instructions executable by one or more processors. The computer-readable storage medium is non-transitory. In some embodiments, one or more (or all) of the operations 400 are performed by applications 122, 132, 142, 209, 322, 350 of the other figures.

The operations 400 include, at block 405, obtaining, by a first application executing on a first computer system, a distance characteristic of a network coupling the first computer system to a second computer system. The characteristic may be a performance characteristic associated with communications between the first application hosted by the first computer systems and another application hosted by another computer system. For example, the characteristic may relate to the latency or packet loss associated with communications between the applications. The characteristic may be an architectural or topological characteristic of the portion of the network that routes traffic between the applications. For example, the characteristic may be a region or division within a hierarchical network topology that includes the computer systems hosting the applications and bounds the routing of communications between the applications. In the embodiments described with reference to FIG. 2, a storage client application or a storage server application may obtain identifiers associated with the locations of the storage client application or the storage server application within a provider network. The application makes a determination based on the identifiers whether the applications are within the same region of the provider network, which may be considered a characteristic of the portion of the provider network coupling the applications.

The operations 400 include, at block 410, selecting, by the first application, a network communications protocol from a plurality of network communications protocols based on the distance characteristic of the network. As described above, a particular communications protocol may offer performance or reliability that varies depending on the network conditions in which it operates. As a result, some protocols may be preferable under some conditions, while other protocols are preferable under other conditions. Based the characteristic, the application can select a suitable protocol for the set of conditions in which the application is operating. For example, the application may select a protocol that offers a high level of performance when the number of routing hops between applications is below a threshold and select a different protocol that offers a lower level of performance when the number of routing hops between the applications is above a threshold. As another example, the application may select a protocol that offers a high level of performance when an average latency between applications is below a threshold and select a different protocol that offers a lower level of performance when the average latency between the applications is above a threshold. As yet another example, the application may select a protocol that offers a high level of performance when the communicating applications are within the same region of a provider network (e.g., same rack, leaf, spine, other region, etc.) and select a different protocol that offers a lower level of performance when the applications are not in the same region of the provider network.

The operations 400 include, at block 415, connecting to a second application executing on the second computer system with the selected network communications protocol. As described above, the applications may initialize communications using a first network communications protocol and switch to another network communications protocol based on the characteristic. In some embodiments, the application making the protocol selection initiates the establishment of the connection with the other application using the selected protocol. In other embodiments, the application making the protocol selection sends a message via a previously established connection to the other application to cause the other application to initiate a connection using the selected protocol. In the embodiments described with reference to FIG. 2, the storage server application determines which protocol to use and sends a message to the storage client application via an established connection. The storage client application initiates the establishment of a connection using a different protocol with the storage server application.

Figure 5:
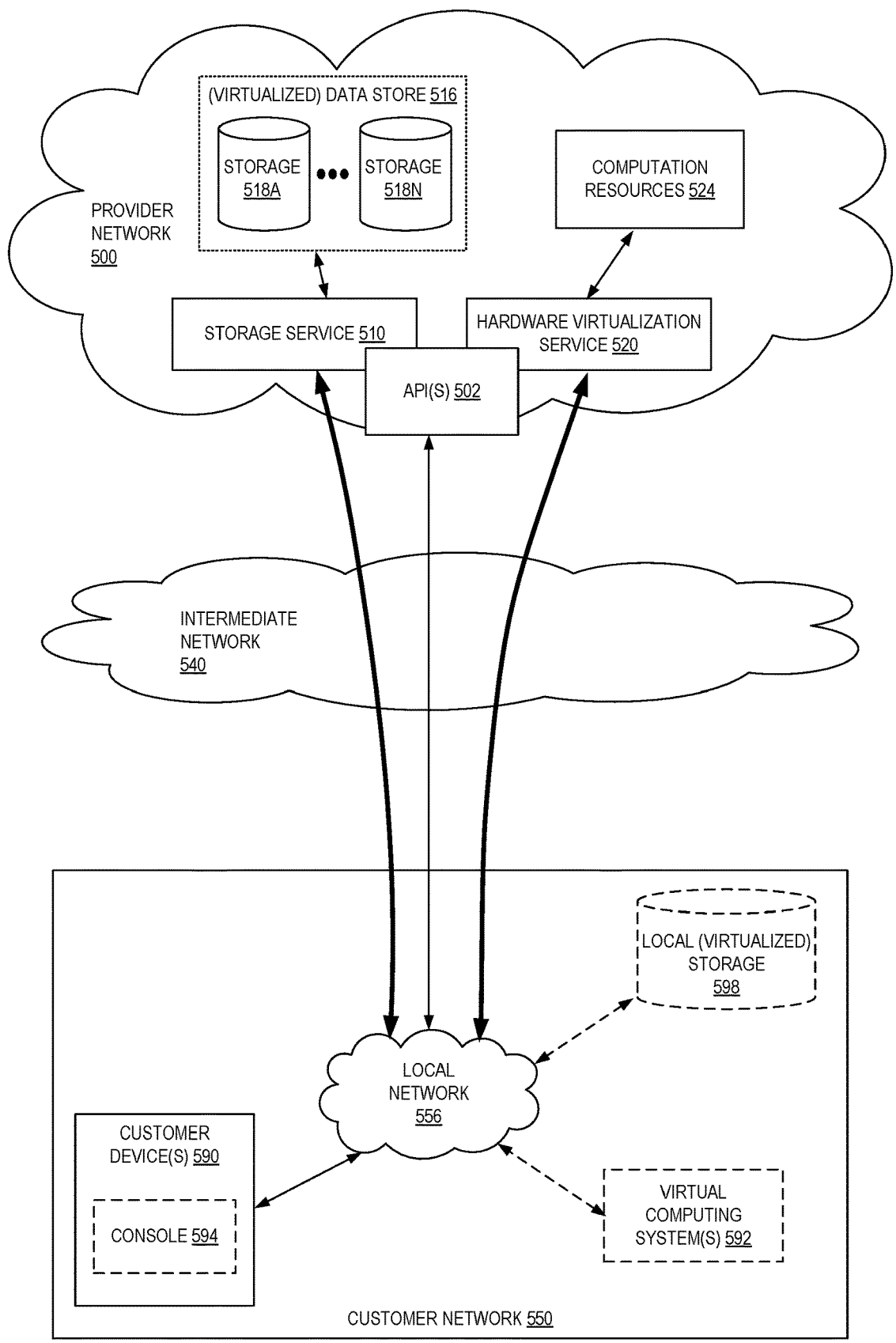
FIG. 5 is a block diagram of an example provider network that provides a storage service and a hardware virtualization service to customers according to some embodiments.

FIG. 5 is a block diagram of an example provider network that provides a storage service and a hardware virtualization service to customers, according to some embodiments. Hardware virtualization service 520 provides multiple computation resources 524 (e.g., VMs) to customers. The computation resources 524 may, for example, be rented or leased to customers of the provider network 500 (e.g., to a customer that implements customer network 550). Each computation resource 524 may be provided with one or more local IP addresses. Provider network 500 may be configured to route packets from the local IP addresses of the computation resources 524 to public Internet destinations, and from public Internet sources to the local IP addresses of computation resources 524.

Provider network 500 may provide a customer network 550, for example coupled to intermediate network 540 via local network 556, the ability to implement virtual computing systems 592 via hardware virtualization service 520 coupled to intermediate network 540 and to provider network 500. In some embodiments, hardware virtualization service 520 may provide one or more APIs 502, for example a web services interface, via which a customer network 550 may access functionality provided by the hardware virtualization service 520, for example via a console 594 (e.g., a web-based application, standalone application, mobile application, etc.). In some embodiments, at the provider network 500, each virtual computing system 592 at customer network 550 may correspond to a computation resource 524 that is leased, rented, or otherwise provided to customer network 550.

From an instance of a virtual computing system 592 and/or another customer device 590 (e.g., via console 594), the customer may access the functionality of storage service 510, for example via one or more APIs 502, to access data from and store data to storage resources 518A-518N of a virtual data store 516 (e.g., a folder or "bucket", a virtualized volume, a database, etc.) provided by the provider network 500. In some embodiments, a virtualized data store gateway (not shown) may be provided at the customer network 550 that may locally cache at least some data, for example frequently-accessed or critical data, and that may communicate with storage service 510 via one or more communications channels to upload new or modified data from a local cache so that the primary store of data (virtualized data store 516) is maintained. In some embodiments, a user, via a virtual computing system 592 and/or on another customer device 590, may mount and access virtual data store 516 volumes via storage service 510 acting as a storage virtualization service, and these volumes may appear to the user as local (virtualized) storage 598.

While not shown in FIG. 5, the virtualization service(s) may also be accessed from resource instances within the provider network 500 via API(s) 502. For example, a customer, appliance service provider, or other entity may access a virtualization service from within a respective virtual network on the provider network 500 via an API 502 to request allocation of one or more resource instances within the virtual network or within another virtual network.

Figure 6:
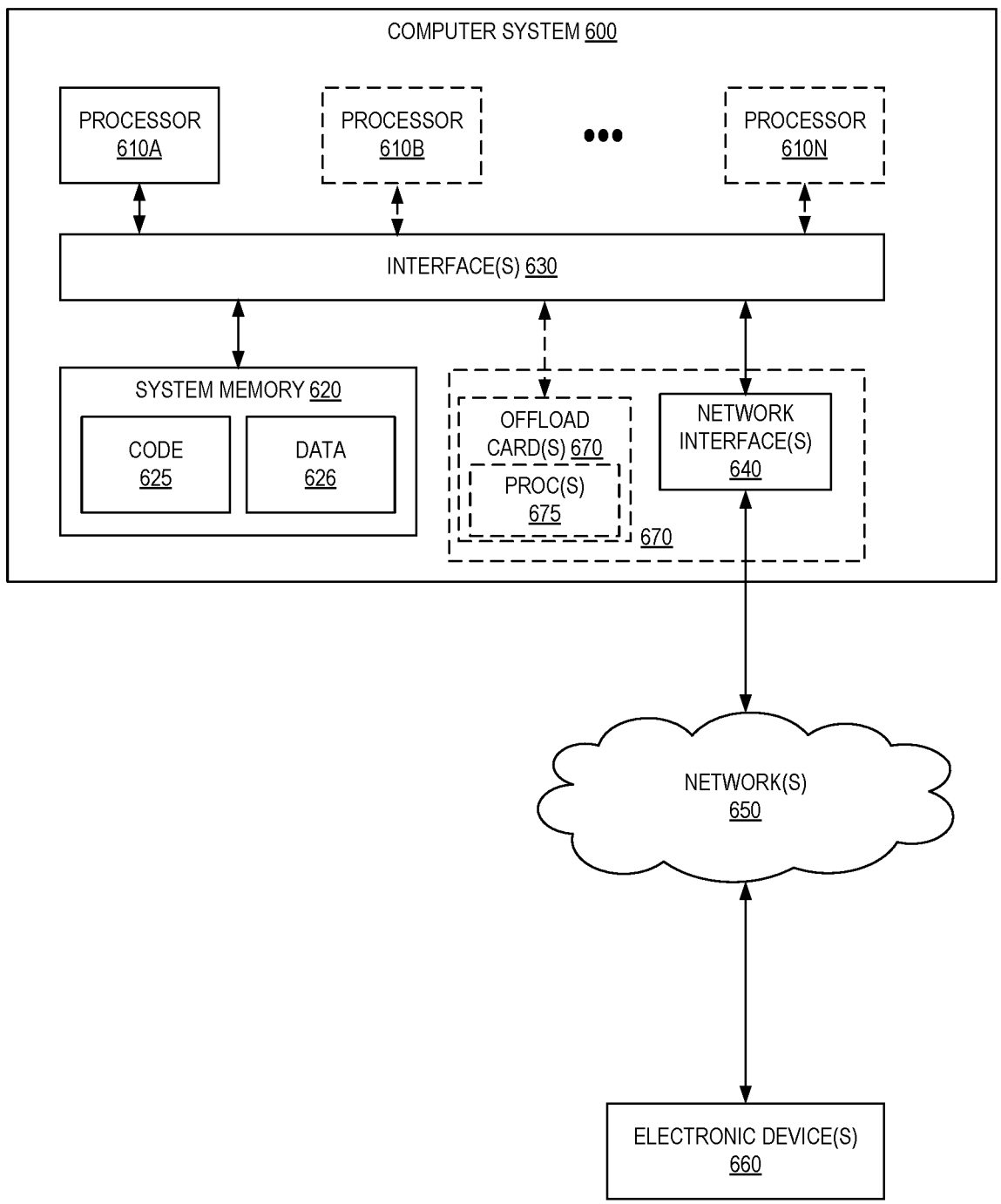
FIG. 6 is a block diagram illustrating an example computer system that may be used in some embodiments.

In some embodiments, a system that implements a portion or all of the techniques for selecting a network communications protocol based on network topology and/or network performance as described herein may include a general-purpose computer system that includes or is configured to access one or more computer-accessible media, such as computer system 600 illustrated in FIG. 6. In the illustrated embodiment, computer system 600 includes one or more processors 610 coupled to a system memory 620 via an input/output (I/O) interface 630. Computer system 600 further includes a network interface 640 coupled to I/O interface 630. While FIG. 6 shows computer system 600 as a single computing device, in various embodiments a computer system 600 may include one computing device or any number of computing devices configured to work together as a single computer system 600.

In various embodiments, computer system 600 may be a uniprocessor system including one processor 610, or a multiprocessor system including several processors 610 (e.g., two, four, eight, or another suitable number). Processors 610 may be any suitable processors capable of executing instructions. For example, in various embodiments, processors 610 may be general-purpose or embedded processors implementing any of a variety of instruction set architectures (ISAs), such as the x86, ARM, PowerPC, SPARC, or MIPS ISAs, or any other suitable ISA. In multiprocessor systems, each of processors 610 may commonly, but not necessarily, implement the same ISA.

System memory 620 may store instructions and data accessible by processor(s) 610. In various embodiments, system memory 620 may be implemented using any suitable memory technology, such as random-access memory (RAM), static RAM (SRAM), synchronous dynamic RAM (SDRAM), nonvolatile/Flash-type memory, or any other type of memory. In the illustrated embodiment, program instructions and data implementing one or more desired functions, such as those methods, techniques, and data described above are shown stored within system memory 620 as code 625 and data 626.

In one embodiment, I/O interface 630 may be configured to coordinate I/O traffic between processor 610, system memory 620, and any peripheral devices in the device, including network interface 640 or other peripheral interfaces. In some embodiments, I/O interface 630 may perform any necessary protocol, timing or other data transformations to convert data signals from one component (e.g., system memory 620) into a format suitable for use by another component (e.g., processor 610). In some embodiments, I/O interface 630 may include support for devices attached through various types of peripheral buses, such as a variant of the Peripheral Component Interconnect (PCI) bus standard or the Universal Serial Bus (USB) standard, for example. In some embodiments, the function of I/O interface 630 may be split into two or more separate components, such as a north bridge and a south bridge, for example. Also, in some embodiments some or all of the functionality of I/O interface 630, such as an interface to system memory 620, may be incorporated directly into processor 610.

Network interface 640 may be configured to allow data to be exchanged between computer system 600 and other devices 660 attached to a network or networks 650, such as other computer systems or devices as illustrated in FIG. 1, for example. In various embodiments, network interface 640 may support communication via any suitable wired or wireless general data networks, such as types of Ethernet network, for example. Additionally, network interface 640 may support communication via telecommunications/telephony networks such as analog voice networks or digital fiber communications networks, via storage area networks (SANs) such as Fibre Channel SANs, or via I/O any other suitable type of network and/or protocol.

In some embodiments, a computer system 600 includes one or more offload cards 670 (including one or more processors 675, and possibly including the one or more network interfaces 640) that are connected using an I/O interface 630 (e.g., a bus implementing a version of the Peripheral Component Interconnect-Express (PCI-E) standard, or another interconnect such as a QuickPath interconnect (QPI) or UltraPath interconnect (UPI)). For example, in some embodiments the computer system 600 may act as a host electronic device (e.g., operating as part of a hardware virtualization service) that hosts compute instances, and the one or more offload cards 670 execute a virtualization manager that can manage compute instances that execute on the host electronic device. As an example, in some embodiments the offload card(s) 670 can perform compute instance management operations such as pausing and/or un-pausing compute instances, launching and/or terminating compute instances, performing memory transfer/copying operations, etc. These management operations may, in some embodiments, be performed by the offload card(s) 670 in coordination with a hypervisor (e.g., upon a request from a hypervisor) that is executed by the other processors 610A-610N of the computer system 600. However, in some embodiments the virtualization manager implemented by the offload card(s) 670 can accommodate requests from other entities (e.g., from compute instances themselves), and may not coordinate with (or service) any separate hypervisor. In some embodiments, an offload card 670 implements the storage client, described herein.

In some embodiments, system memory 620 may be one embodiment of a computer-accessible medium configured to store program instructions and data as described above. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computer system 600 via I/O interface 630. A non-transitory computer-accessible storage medium may also include any volatile or non-volatile media such as RAM (e.g., SDRAM, double data rate (DDR) SDRAM, SRAM, etc.), read only memory (ROM), etc., that may be included in some embodiments of computer system 600 as system memory 620 or another type of memory. Further, a computer-accessible medium may include transmission media or signals such as electrical, electromagnetic, or digital signals, conveyed via a communication medium such as a network and/or a wireless link, such as may be implemented via network interface 640.

Various embodiments discussed or suggested herein can be implemented in a wide variety of operating environments, which in some cases can include one or more user computers, computing devices, or processing devices which can be used to operate any of a number of applications. User or client devices can include any of a number of general-purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and/or other devices capable of communicating via a network.

Most embodiments utilize at least one network that would be familiar to those skilled in the art for supporting communications using any of a variety of commercially-available protocols, such as Transmission Control Protocol/Internet Protocol (TCP/IP), File Transfer Protocol (FTP), Universal Plug and Play (UPnP), Network File System (NFS), Common Internet File System (CIFS), Extensible Messaging and Presence Protocol (XMPP), AppleTalk, etc. The network(s) can include, for example, a local area network (LAN), a wide-area network (WAN), a virtual private network (VPN), the Internet, an intranet, an extranet, a public switched telephone network (PSTN), an infrared network, a wireless network, and any combination thereof.

In embodiments utilizing a web server, the web server can run any of a variety of server or mid-tier applications, including HTTP servers, File Transfer Protocol (FTP) servers, Common Gateway Interface (CGI) servers, data servers, Java servers, business application servers, etc. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, PHP, or TCL, as well as combinations thereof. The server(s) may also include database servers, including without limitation those commercially available from Oracle®, Microsoft®, Sybase®, IBM®, etc. The database servers may be relational or non-relational (e.g., "NoSQL"), distributed or non-distributed, etc.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and/or at least one output device (e.g., a display device, printer, or speaker). Such a system may also include one or more storage devices, such as disk drives, optical storage devices, and solid-state storage devices such as random-access memory (RAM) or read-only memory (ROM), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. It should be appreciated that alternate embodiments may have numerous variations from that described above. For example, customized hardware might also be used, and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory (EEPROM), flash memory or other memory technology, Compact Disc-Read Only Memory (CD-ROM), Digital Versatile Disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

In the preceding description, various embodiments are described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Bracketed text and blocks with dashed borders (e.g., large dashes, small dashes, dot-dash, and dots) are used herein to illustrate optional operations that add additional features to some embodiments. However, such notation should not be taken to mean that these are the only options or optional operations, and/or that blocks with solid borders are not optional in certain embodiments.

Reference numerals with suffix letters (e.g., 210A-210D, 260A-260H) may be used to indicate that there can be one or multiple instances of the referenced entity in various embodiments, and when there are multiple instances, each does not need to be identical but may instead share some general traits or act in common ways. Further, the particular suffixes used are not meant to imply that a particular amount of the entity exists unless specifically indicated to the contrary. Thus, two entities using the same or different suffix letters may or may not have the same number of instances in various embodiments.

References to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Moreover, in the various embodiments described above, unless specifically noted otherwise, disjunctive language such as the phrase "at least one of A, B, or C" is intended to be understood to mean either A, B, or C, or any combination thereof (e.g., A, B, and/or C). As such, disjunctive language is not intended to, nor should it be understood to, imply that a given embodiment requires at least one of A, at least one of B, or at least one of C to each be present.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

What is claimed is:

1. A computer-implemented method comprising:
    obtaining, by a first application executing on a first computer system in a network, a distance characteristic of a connection within the network coupling the first computer system to a second computer system, the distance characteristic indicating that the second computer system is in a same region of the network as the first computer system;
    selecting, by the first application, a network communications protocol from a plurality of network communications protocols based on the distance characteristic of the network indicating that the second computer system is in the same region of the network as the first computer system; and
    connecting to a second application executing on the second computer system with the selected network communications protocol.

2. The computer-implemented method of claim 1, wherein the distance characteristic of the network is an average packet latency between the first computer system and the second computer system, and wherein the region is one of a rack, leaf or spine.

3. The computer-implemented method of claim 1, wherein the distance characteristic of the network is a number of hops between the first computer system and the second computer system.

4. The computer-implemented method of claim 1, wherein the network is a storage network, the first and second computer systems further store first and second partitions of a storage volume, and the region is one of a rack, leaf or spine.

5. The computer-implemented method of claim 1, wherein the distance characteristic of the network is a number of hops associated with communications between the first application and the second application.

6. The computer-implemented method of claim 1, wherein the distance characteristic of the network is based on a latency associated with communications between the first application and the second application, and wherein the region is one of a rack, leaf or spine.

7. The computer-implemented method of claim 1, further comprising obtaining a first identifier associated with a location of the first computer system in the network and a second identifier associated with a location of the second computer system in the network, wherein the distance characteristic of the network is based at least in part on the first and second identifiers.

8. The computer-implemented method of claim 1, further comprising disconnecting a connection to the second application established with a different network communications protocol than the selected network communications protocol.

9. The computer-implemented method of claim 1, wherein the selected network communications protocol is a transport layer protocol.

10. The computer-implemented method of claim 1, wherein the selected network communications protocol is a network-based storage protocol.

* * * * *